(12) United States Patent
Muraki

(10) Patent No.: US 7,834,911 B2
(45) Date of Patent: Nov. 16, 2010

(54) IMAGING DEVICE HAVING MULTIPLE IMAGING ELEMENTS

(75) Inventor: Jun Muraki, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 704 days.

(21) Appl. No.: 11/500,030

(22) Filed: Aug. 7, 2006

(65) Prior Publication Data

US 2007/0076100 A1    Apr. 5, 2007

(30) Foreign Application Priority Data

Sep. 30, 2005    (JP)    ............... 2005-286232

(51) Int. Cl.
*H04N 5/225*    (2006.01)
(52) U.S. Cl. .................. 348/220.1; 348/262
(58) Field of Classification Search ............. 348/220.1, 348/262
See application file for complete search history.

(56) References Cited

U.S. PATENT DOCUMENTS

2003/0160886 A1 *    8/2003    Misawa et al. .............. 348/347

FOREIGN PATENT DOCUMENTS

| CN | 1407792 A | 4/2003 |
|---|---|---|
| JP | 04-068873 A | 3/1992 |
| JP | 04-345279 A | 12/1992 |
| JP | 2003-333409 A | 11/2003 |
| JP | 2005-109979 A | 4/2005 |
| JP | 2005-175571 A | 6/2005 |
| JP | 2005-191813 A | 7/2005 |

OTHER PUBLICATIONS

Chinese Office Action dated Dec. 12, 2008 and English translation thereof issued in counterpart Chinese application Serial No. 2006101414550.
Japanese Office Action dated Aug. 2, 2010 and English translation thereof, issued in counterpart Japanese Application No. 2005-286232.

* cited by examiner

*Primary Examiner*—David L Ometz
*Assistant Examiner*—Antoinette T Spinks
(74) *Attorney, Agent, or Firm*—Holtz, Holtz, Goodman & Chick, PC

(57) ABSTRACT

In through image display mode, a CPU drives two CCDs under control suitable for the through image display in such a way that image data captured by both CCDs are read out alternately (S1), and displays image data output alternately from one CCD and the other CCD on a display unit (S2). In an AF mode, the CPU changes over a driving of one CCD to a driving suitable for an AF process to executes the AF process (S4), and performs through image display on image data imaged by the other CCD (S5). In a still picture shooting mode, the CPU drives the one CCD under control suitable for a still picture shooting process to execute the still picture shooting process (S10), and performs through image display on image data imaged by the other CCD (S11).

21 Claims, 11 Drawing Sheets

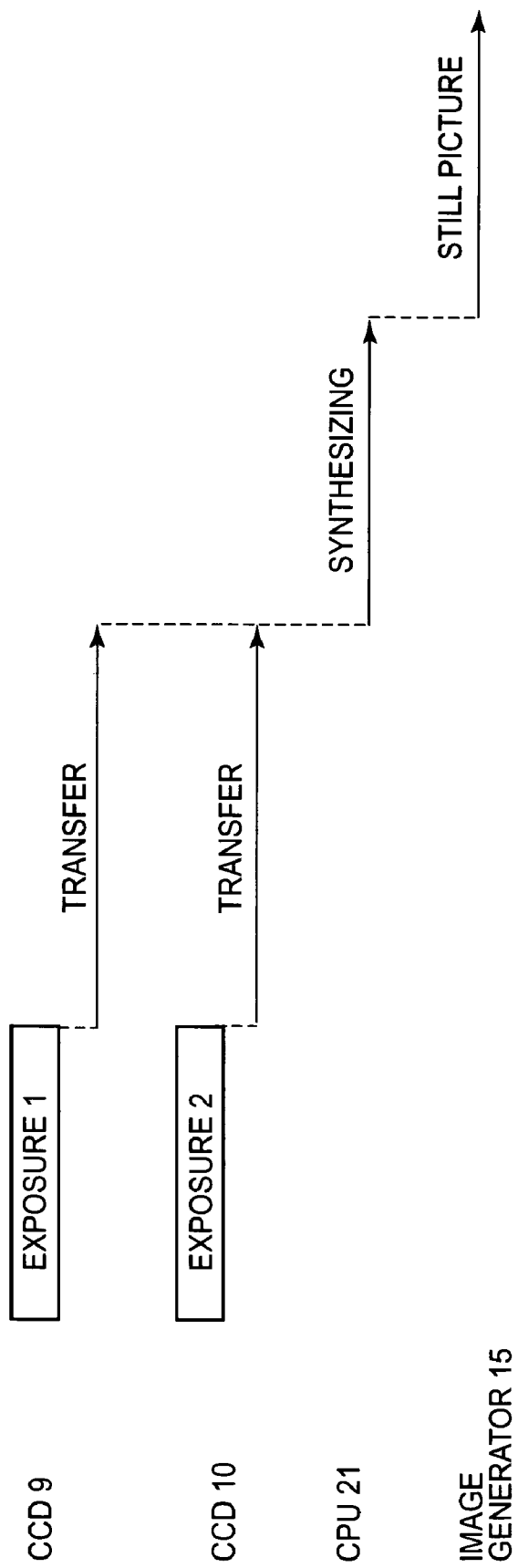

IMAGING DEVICE HAVING MULTIPLE IMAGING ELEMENTS

BACKGROUND OF THE INVENTION

1. Field of the Invention

The present invention relates to an imaging device having a plurality of imaging elements and an imaging method which are applicable to a digital camera.

2. Description of the Related Art

Conventionally, there is an imaging device which raises the frame rate of image data by increasing the drive frequency of an imaging element, performing pixel addition driving, and driving (partial read-out driving) the imaging element in such a way that only image data in an partial area of the imaging element is read out.

The process time of an auto focus (AF) process by a contrast detection scheme depends on the frame rate of image data. If the frame rate is high, the AF process time can be reduced by what corresponds to that the frame rate becomes high.

To reduce the AF process time, there is a technique which displays an image in a partial area in real time, and displays an image imaged at past in the other areas when the AF process is in progress, thereby displaying a through image in real time when the AF process is in progress, and reducing the AF process time (Unexamined Japanese Patent Application KOKAI Publication No. 2003-333409).

SUMMARY OF THE INVENTION

It is an object of the invention to provide an imaging device and an imaging method which increase a frame rate at the time of shooting a motion picture and at the time of displaying a through image of an object, and enhance performance in an auto focus process.

An imaging device according to the first aspect of the invention comprises:

first and second imaging elements each of which converts a light of an object into image data;

a motion picture imaging controller which controls imaging of a motion picture of the object in such a way that image data converted by the first imaging element and image data converted by the second imaging element are alternately output by driving the first and second imaging elements; and a focus controller which controls either one of the first and second imaging elements to image the motion picture of the object, and controls an other imaging element to perform auto focusing on the object.

An imaging device according to the second aspect of the invention comprises:

a plurality of imaging elements each of which converts a light of an object into image data;

an acquisition unit which divides a still picture exposure time required for a single imaging element to perform still picture shooting into a number of the imaging elements to cause the plurality of imaging elements to perform exposure for a divided exposure time, and acquires respective image data converted by the plurality of imaging elements; and a generator which generates composite image data from a plurality of image data obtained by the acquisition unit.

An imaging device according to the third aspect of the invention comprises:

first and second imaging elements each of which converts a light of an object into image data;

a still picture shooting controller which controls the first imaging element to image a motion picture of the object, and controls the second imaging element to shoot a still picture of the object; and an image generator which sequentially generates through data or motion picture data from image data output from the first imaging element by the still picture shooting controller, and generates still picture data between generation of those through data and motion picture data separately in multiple times based on image data output from the second imaging element.

An imaging method of an imaging device having first and second imaging elements each of which converts a light of an object into image data according to the fourth aspect of the invention, comprises:

a motion picture imaging step of imaging a motion picture of the object in such a way that image data converted by the first imaging element and image data converted by the second imaging element are alternately output by driving the first and second imaging elements; and a focus control step of controlling either one of the first and second imaging elements to image the motion picture of the object, and controlling an other imaging element to perform auto focusing on the object.

A computer-readable recording medium storing a program that is executed by a computer having first and second imaging elements each of which converts a light of an object into image data according to the fifth aspect of the invention, and allows the computer to function as:

a motion picture imaging controller which images a motion picture of the object in such a way that image data converted by the first imaging element and image data converted by the second imaging element are alternately output by driving the first and second imaging elements; and a focus controller which controls either one of the first and second imaging elements to image the motion picture of the object, and controls an other imaging element to perform auto focusing on the object.

BRIEF DESCRIPTION OF THE DRAWINGS

These objects and other objects and advantages of the present invention will become more apparent upon reading of the following detailed description and the accompanying drawings in which:

FIG. 11 is a time chart illustrating operations of the CCD 9, the CCD 10, the CPU 21, and the image generator 15.

DETAILED DESCRIPTION OF THE PREFERRED EMBODIMENTS

Embodiments of the invention taking a digital camera as an example of an imaging device of the invention will be explained in detail with reference to the accompanying drawings.

First Embodiment

A. Structure of Digital Camera

Figure 1:
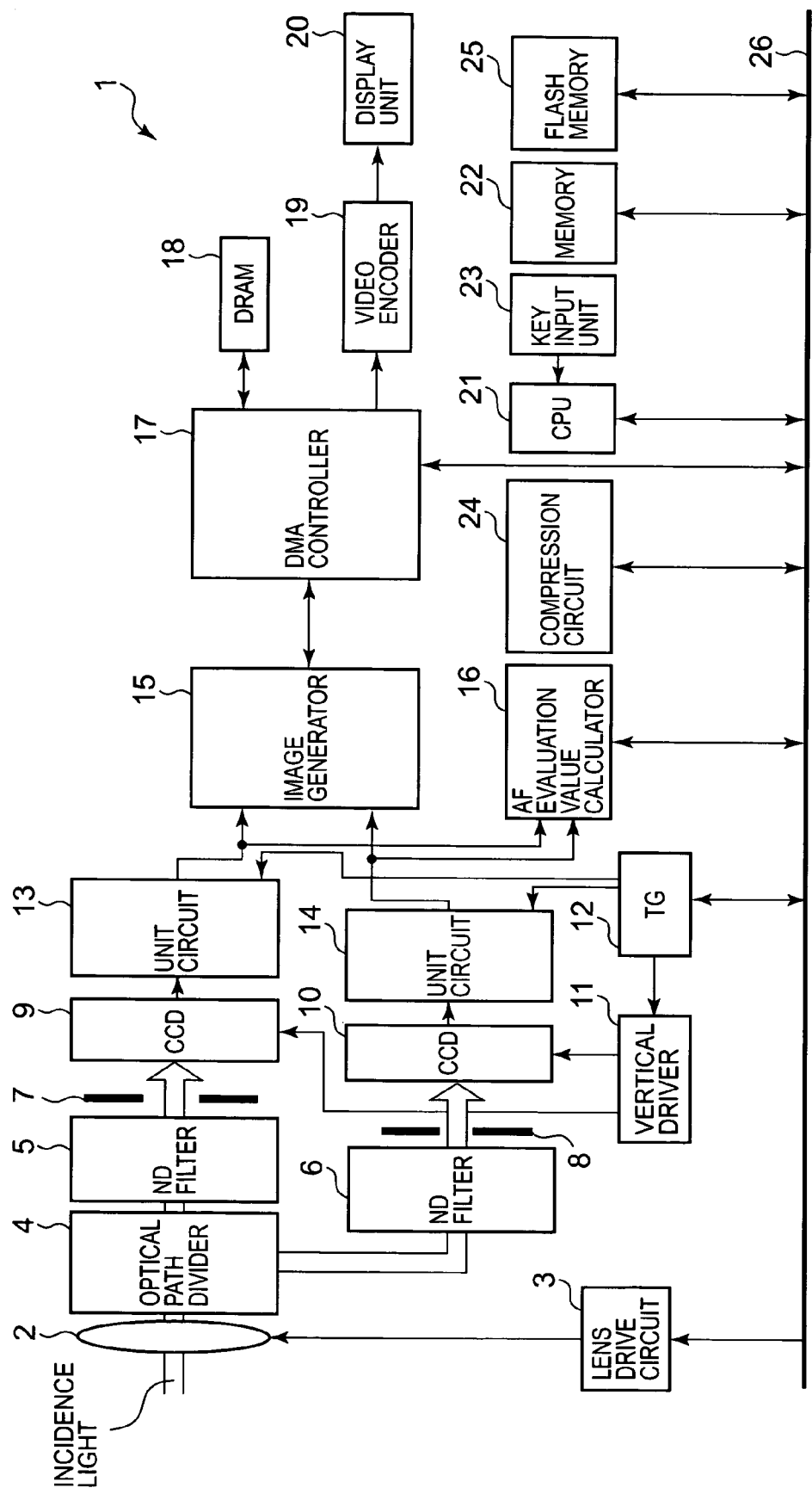
FIG. 1 is a block diagram of a digital camera according to a first embodiment of the invention.

FIG. 1 is a block diagram illustrating the schematic structure of a digital camera 1 which realizes the imaging device of the invention.

The digital camera 1 has a shooting lens 2, a lens drive circuit 3, an optical path divider 4, an ND (Neutral Density) filter 5, an ND filter 6, an aperture shutter 7, an aperture shutter 8, a CCD 9, a CCD 10, a vertical driver 11, a TG (Timing Generator) 12, a unit circuit 13, a unit circuit 14, an image generator 15, an AF evaluation value calculator 16, a DMA controller 17, a DRAM 18, a video encoder 19, a display unit 20, a CPU 21, a memory 22, a key input unit 23, a compression circuit 24, a flash memory 25, and a bus 26.

The shooting lens 2 includes a focus lens and a zoom lens both not illustrated, and is connected to the lens drive circuit 3. The lens drive circuit 3 comprises a motor which drives the non-illustrated focus lens and zoom lens in respective optical axis directions, a focus motor driver and zoom motor driver which respectively drive a focus motor and a zoom motor in the optical axis directions in accordance with control signals from the CPU 21.

The optical path divider 4 comprises an optical member which divides the shooting luminous flux of a prism, a half mirror or the like in two. The optical path divider 4 divides a luminous flux entering through the shooting lens 2 in two flux components. The divided luminous flux components are projected to the CCD 9 and the CCD 10 through the ND filter 5 and the aperture shutter 7, and the ND filter 6 and the aperture shutter 8, respectively.

The ND filters 5, 6 serve to reduce the amount of an entered light. That is, the ND filters 5, 6 reduce the respective amounts of lights obtained by dividing the entered light by the optical path divider 5 in two.

The aperture shutters 7, 8 respectively have non-illustrated drive circuits which operate the aperture shutters 7, 8 in accordance with control signals sent from the CPU 21. Each of the aperture shutters 7, 8 functions as an aperture and a shutter.

The aperture is a mechanism which controls the amount of an entering light. The shutter is a mechanism which controls a time for raying lights on the CCDs 9, 10. The time for shedding the lights on the CCDs 9, 10 varies depending on the speed of opening/closing the shutter (shutter speed). Exposure can be set by the aperture and the shutter speed.

The CCDs 9, 10, which are scan-driven by the vertical driver 11, perform optical-electrical conversion on the intensity of each color light of the RGB value of an object for each predetermined period, and output it to the unit circuits 13, 14, respectively. The operation timings of the vertical driver 11, the unit circuit 13 and the unit circuit 14 are controlled by the CPU 21 through the TG 12.

Each of the unit circuits 13, 14 comprises a CDS (Correlated Double Sampling) circuit which performs correlated double sampling on an imaging signal sent from the CCD 9 or the CCD 10 and holds it, an AGC (Automatic Gain Control) circuit which performs automatic gain control on the imaging signal undergone the sampling, and an A/D converter which converts the analog signal undergone the automatic gain control into a digital signal. The imaging signals of the CCDs 9, 10 are sent to the image generator 15 as digital signals through the unit circuits 13, 14.

The image generator 15 performs image processes, such as a pixel interpolation process, a γ correction process, a white balance process, and a process of generating a brightness color difference signal (YUV data), on image data sent from the unit circuits 13, 14.

The AF evaluation value calculator 16 extracts a high frequency component based on image data within a focus area obtained by the CCD at each focus point (focus lens position) at the time of auto focusing, integrates the extracted high frequency component, and calculates an AF evaluation value. As the CPU 21 sends a control signal to the lens drive circuit 3 based on the calculated AF evaluation value, the focus lens is moved to a focused lens position.

The DMA controller 17 is for data transfer between the image generator 15 and the DRAM 18, between the DRAM 18 and the video encoder 19, and between the DRAM 18 and the bus 26.

The DRAM 18 is a kind of rewritable semiconductor devices, and is used as a buffer memory which temporarily stores image data (YUV data generated by the image generator 15) imaged by the CCDs 9, 10, and a working memory for the CPU 21.

The video encoder 19 converts digital signals of image data read out from the DRAM 18 into analog signals, and sequentially outputs the analog signals at a timing according to the scanning scheme of the display unit 20.

The display unit 20 includes a color LCD and a drive circuit therefor. The display unit 20 displays image data (YUV data) which is imaged by the CCDs 9, 10 and stored in the DRAM 18 in a shooting mode, and displays expanded recorded image data read out from the flash memory 25 at the time of reproduction.

The CPU 21 is a one chip microcomputer which controls each unit of the foregoing digital camera 1.

The memory 22 stores a control program necessary for controlling each unit of the CPU 21, and necessary data. The CPU 21 operates in accordance with the control program.

The key input unit 23 includes a plurality of manipulation keys, such as a mode changing key, a shutter button which is pressable halfway and fully, a cross key, and a SET key, and outputs a manipulation signal according to a user's key manipulation to the CPU 21.

The compression circuit 24 performs compression/expansion according to the JPEG (Joint Photographic Experts Group) standard and the MPEG (Moving Picture Experts Group) standard. The compression circuit 24 compresses image data (YUV signal) stored in the DRAM 18, and expands image data stored in the flash memory 25 in accordance with control signals from the CPU 21.

The flash memory 25 is a recording medium which saves, for example, image data compressed by the compression circuit 24.

B. Next, the driving method of the CCDs 9, 10 and the operation method of the image generator 15 which are the characteristics of the invention will be explained.

Electric charges charged in the CCDs 9, 10 are read out in accordance with a predetermined frequency timing signal generated by the vertical driver 11. Suitable driving methods for through image display, an AF process, and a still picture shooting process differ. That is, there is a driving method which is suitable for through image display and a driving method which is suitable for the AF process. Note that the vertical driver 11 is controlled by the CPU 21 through the TG 12.

B-1. In the Through Image Display Mode

In the through image display mode, the CPU 21 drives the CCDs 9, 10 under control which is suitable for through image display to display image data imaged by the CCDs 9, 10 on the display unit 20. At this time, the CPU 21 alternately drives the CCD 9 and the CCD 10 (with the drive period of the CCD 9 and the drive period of the CCD 10 shifted by a half period). Accordingly, the CCD 9 and the CCD 10 alternately perform exposure and transmission, so that image data are output alternately from the CCD 9 and the CCD 10.

Driving under the control suitable for the through image display is to perform both of driving suitable for the through image display and driving under exposure control suitable for the through image display.

As the driving suitable for the through image display, a scheme of reading out electric charges charged in all pixels of the CCD 9 and the CCD 10 one line by one line, and reading out the electrical charges of all pixels can be applied. According to this scheme, however, the CPU 21 needs a time to read out all of the electrical charges charged in all pixels of the CCD 9 and the CCD 10. If the resolution of the image data obtained by the CCD 9 and the CCD 10 are greater than the resolution of the display unit 20, the CPU 21 must reduce the resolution of the obtained image data, and display the image data on the display unit 20. Accordingly, in the embodiment, the CPU 21 reads out image data with the number of pixels thereof reduced or reads out the image data undergone pixel addition in such a way that the image size of the image data initially matches with the resolution of the display unit 20. This makes it possible to display a through image with a smooth motion. In the through image driving, image data undergone two pixel addition is to be read out.

Driving under exposure control suitable for the through image display is to drive the CCDs 9, 10 in such a way that an exposure time becomes suitable for the through image display by an electrical shutter.

The image generator 15 performs an image process for the through image display on image data output alternately from the CCD 9 and the CCD 10, thereby generating through image data. Image data undergone the image process is stored in the buffer memory every time the image process is finished. The stored image data is displayed as through image on the display unit 20.

Figure 2:
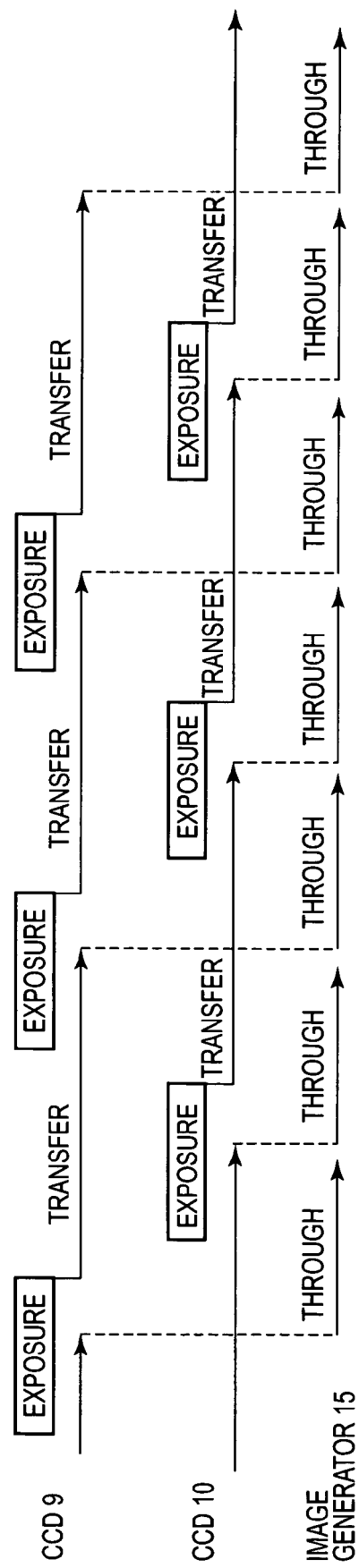
FIG. 2 is a time chart illustrating driving of a CCD 9 and a CCD 10, and an operation of an image generator 15 in a through image display mode.

FIG. 2 is a time chart illustrating the driving of the CCD 9 and the CCD 10 and the operation of the image generator 15 in the through image display mode.

As illustrated in the figure, while the CCD 9 is transferring exposed electrical charges as image data, the CCD 10 is performing exposure, and while the CCD 10 is transferring image data, the CCD 9 is performing exposure. That is, an exposure period is shifted by a half period. As the CCD 9 and the CCD 10 perform exposure and transferring alternately, it is possible to double the frame rate of image data subjected to the through image display without increasing the driving frequencies of the CCDs 9, 10.

The image generator 15 has a capability of performing an image process at the frame rate of image data subjected to the through image display (frame rate twice as much as the frame rate of image data obtained by the CCDs 9, 10). The image generator 15 may not have a capability of performing the image process at a speed faster than that frame rate, or a capability of performing a parallel image process.

B-2. In the AF Mode

In the AF mode, the CPU 21 causes the AF evaluation value calculator 16 to detect an AF evaluation value at each lens position of the focus lens. The CPU 21 drives one CCD under control suitable for the through image display, and drives the other CCD under control suitable for the AF process to display the through image of the object.

Driving suitable for the AF process is a driving which enhances the accuracy of the AF process.

Some examples of a driving method which is suitable for the AF process will be explained below.

B-2a. First, an explanation will be given of a method of enhancing the accuracy of the AF process by fast driving (driving of the CCD in such a way that the read-out period of image data is hastened) to shorten an AF process time.

In the AF process by a contrast detection scheme, the lens drive circuit 3 moves the focus lens from the lens end to the lens end. The lens drive circuit 3 detects the AF evaluation value at each lens position of the focus lens, and moves the focus lens to a lens position where an AF evaluation value in the detected AF evaluation values becomes a peak, thereby performing auto focus.

To reduce the time of the AF process by the contrast detection scheme, the moving speed of the focus lens may be speeded up. Even if just the moving speed of the focus lens is speeded up without changing the read-out period (transfer period) of the CCD (without changing the frame rate), the number of the lens positions (focus points) where the AF evaluation values are detected are reduced, so that a focus accuracy becomes rough. Accordingly, by hastening the read-out period, and speeding up the moving speed of the focus lens in accordance with the read-out period, it is possible to shorten the AF process time without decreasing the focus accuracy. This results in enhancement of the accuracy of the AF process.

For example, it is supposed that there are eight focus points where an AF process by a normal contrast detection scheme detects the AF evaluation values. In this case, if the moving speed of the focus lens is just doubled, the number of the focus points where the AF evaluation values are detected is reduced to four. However, if the read-out period is doubly hastened and the moving speed of the focus lens is doubled, the AF process time shorten by approximately half, and the focus points where the AF evaluation values are detected remain at eight.

The fast driving means driving faster than the driving suitable for the through image display. The frame rate by the fast driving is higher than the frame rate by the driving suitable for the through image display or the frame rate of through image displayed in the through image display mode (frame rate twice as much as a frame rate by the driving suitable for the through image display).

Some of the fast driving methods will be described below.

B-2a-1. Partial Read-Out Driving

The partial read-out driving is to drive the CCD in such a manner as to read out image data on the lines of a partial area of the CCD (the partial area includes the focus area).

It is supposed that the partial area to be read out is the half lines of all lines of the CCD, and is lines at the central part of the CCD.

In a case where the partial read-out driving is performed, as same as a case where the driving suitable for the through image display is performed, image data may be read out with the number of pixels reduced, or the image data undergone pixel addition may be read out in the partial area of the CCD.

According to the partial read-out driving, as the CPU 21 reads out image data on the partial area, it is possible to raise the frame rate more than that of the driving suitable for the through image display. That is, if image data of 1/N (N is an arbitrary number) lines in all lines of the CCD is read out (transferred) by the partial read-out driving, it is possible to raise the frame rate approximately N times as much as that of the driving suitable for the through image display. However, in a case where image data is read out by pixel-number-reduction read-out or pixel addition driving, it is supposed that the partial read-out driving is performed with image data undergone comparable pixel-number-reduction read-out or pixel addition driving.

For example, if image data on the half lines of all lines of the CCD is read out, it is possible to raise the frame rate approximately twice as much as that of the driving suitable for the through image display.

B-2a-2. Pixel Addition Driving

The pixel addition driving is a read-out method of adding electrical charges charged in the pixels of the CCD, and is a well-known technology, so that an explanation thereof will be omitted.

It has been explained that electrical charges charged in the pixels may be read out in the driving suitable for the through image display with the pixel addition driving performed. Here, the pixel addition driving means, however, to add and read out electrical charges charged in the pixels in such an extent as not to be suitable for the through image display. That is, as the number of pixels added by the pixel addition driving increases, the frame rate is raised, but the resolution is reduced by what corresponds to the raising of the frame rate, and it becomes not suitable for the through image display.

For example, in the driving suitable for the through image display, the CPU 21 reads out image data with electrical charges charged in two pixels added thereto, and in the driving suitable for AF control (pixel addition driving), the CPU 21 reads out image data with electrical charges charged in eight pixels added thereto. In this case, the driving suitable for the AF control raises the frame rate four times as much as that of the driving suitable for the through image display.

B-2a-3. Other Driving Methods

The method of raising the frame rate higher than that of the driving suitable for the through image display is not limited to the partial read-out driving and the pixel addition driving, but may be pixel-number-reduction read-out, and other methods. A method of raising the frame rate by combining, for example, the partial read-out driving and the pixel addition driving may be employed. That is, a driving method which raises the frame rate higher than the frame rate of the driving suitable for the through image display or the frame rate of through image displayed in the through image display mode is acceptable.

B-2b. Next, a method of enhancing the accuracy of the AF process by an exposure control will be explained.

In detecting the AF evaluation value, as the CCD is driven under exposure control suitable for the through image display, the detection accuracy of a detected AF evaluation value decreases. Accordingly, in the AF mode, the accuracy of the AF process is enhanced by driving the CCD under exposure control suitable for detection of the AF evaluation value.

Even if the CCD is driven under the exposure control suitable for the detection of the AF evaluation value, the frame rate is not raised (a read-out period is not shortened). Accordingly, the AF process time is not shortened, but there is an advantage such that the accuracy of the detected AF evaluation value is enhanced.

The image generator 15 generates through image data of image data sequentially output from the other CCD driven under the control suitable for the through image display. Note that image data output from the one CCD driven under the control suitable for the AF process is sent to the AF evaluation value calculator 16, and the AF evaluation value calculator 16 detects the AF evaluation values sequentially based on the sent image data.

Figure 3:
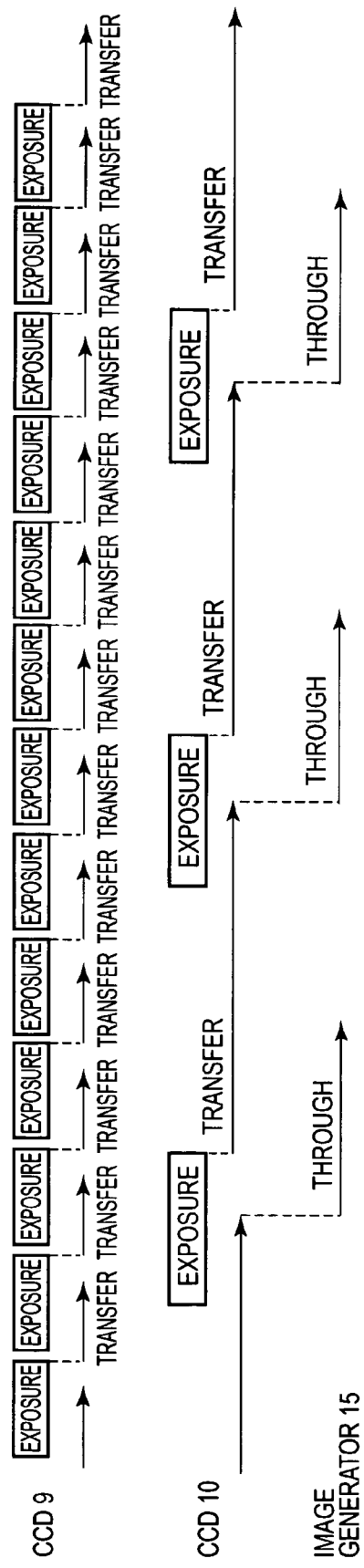
FIG. 3 is a time chart illustrating driving of the CCD 9 and CCD 10, and an operation of the image generator 15 in an AF mode.

FIG. 3 is a time chart illustrating the driving of the CCDs 9, 10 and the operation of the image generator 15 in the AF mode. The CCD 9 is driven under the control suitable for the AF process, while the CCD 10 is driven under the control suitable for the through image display.

The CCD 9 is driven by driving which is a combination of the pixel addition driving (four pixel addition driving) and the partial read-out driving (read-out driving of half lines of all lines), and the driving under the exposure driving suitable for the AF process. The CCD 10 is driven by driving which is a combination of the driving under the control suitable for the through image display, i.e., the pixel addition driving (two pixel addition driving) and the driving under the exposure control suitable for the through image display.

Because the CCD 9 is driven by the four pixel addition driving and the partial read-out driving, and the CCD 10 is driven by the two pixel addition driving, the frame rate, transfer period and exposure period of image data output from the CCD 9 are four times as much as the frame rate, transfer period, and exposure period of image data output from the CCD 10 as illustrated in FIG. 3. Because the CCD 9 is under the exposure control suitable for the AF process by the CPU 21, and the CCD 10 is under the exposure control suitable for the through image display by the CPU 21, the CCD 9 and the CCD 10 have different exposure times.

The image generator 15 generates through image data based on image data sequentially sent from only the CCD 10 through the unit circuit 14. The through image data undergone the image process is stored in the buffer memory, and displayed as a through image on the display unit 20.

Image data sequentially sent from the CCD 9 through the unit circuit 13 is sent to the AF evaluation value calculator 16. The AF evaluation value calculator 16 sequentially detects the AF evaluation values based on the sent image data.

As explained, in the AF mode, by driving the one CCD under the control suitable for the AF process, and driving the other CCD under the control suitable for the through image display, it is possible to accurately execute the AF process. The CPU 21 can display the through image of the object on the display unit 20 even if the AF process is in progress.

It is apparent from a result of comparison between FIG. 2 and FIG. 3, in the through image display of FIG. 2, as the CPU 21 displays image data output alternately from the CCD 9 and the CCD 10, the frame rate of image data subjected to the through image display is twice as much as that of the frame rate of image data output from the CCDs 9, 10. On the other hand, in the through image display in the AF mode (through image display of FIG. 3), as the CPU 21 displays image data output only from the CCD 10 on the display unit 20, the frame rate of the image data undergone the through image display becomes the half of the frame rate of image data in the case of FIG. 2.

B-3. In the Still Picture Shooting Mode

In the still picture shooting mode, the CPU 21 performs still picture shooting on the object. The CPU 21 drives the one CCD under the control suitable for the through image display, and drives the other CCD under the control suitable for still picture shooting to display the through image of the object.

Driving under the control suitable for the still picture shooting is driving which executes an exposure control suitable for the still picture shooting, and reads out electrical charges charged in all pixels of the CCD by reading out the electrical charges charged in all pixels one line by one line. The exposure control may be executed with the aperture shutter 7 without performing the driving under the exposure control suitable for the still picture shooting.

The image generator 15 generates through image data based on image data sequentially output only from the one CCD driven under the control suitable for the through image display. The image generator 15 performs an image process for the still picture shooting on image data output from the other CCD driven under the control suitable for the still picture shooting separately in multiple times. Accordingly, still picture data is generated. That is, the still picture data is generated during generation of the through image data from image data transferred at the transfer period of the CCD driven under the control suitable for the through image display.

Figure 4:
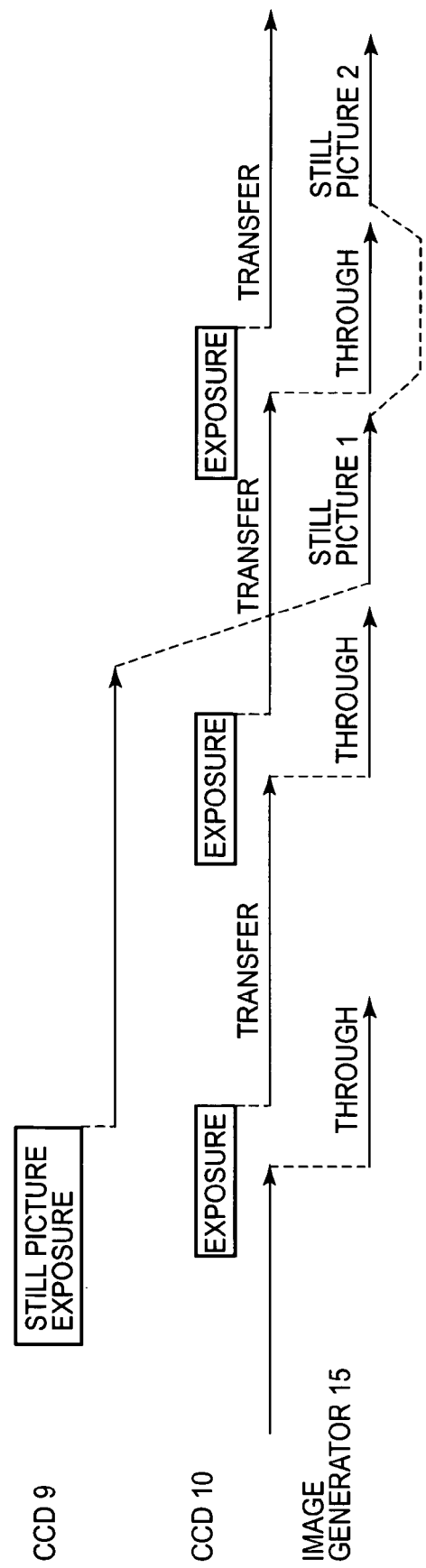
FIG. 4 is a time chart illustrating driving of the CCD 9 and CCD 10, and an operation of the image generator 15 in a still picture shooting mode.

FIG. 4 is a time chart illustrating the driving of the CCDs 9, 10 and the operation of the image generator 15 in the still picture shooting mode. The CCD 9 is driven under the control suitable for the still picture shooting, and the CCD 10 is driven under the control suitable for the through image display.

As illustrated in the figure, the image generator 15 generates the through image data from the image data sequentially transferred at the transfer period of the CCD 10. The image generator 15 generates the still picture data from the image data transferred from the CCD 9 separately in multiple times.

That is, the image generator 15 has a capability of performing the image process at a frame rate twice as much as the frame rate of the image data read out from the CCDs 9, 10 illustrated in FIG. 2. Instead of generating the through image data from the image data transferred from the CCD 9 driven under the control suitable for the through image display, the image generator 15 generates the still picture data from the image data transferred from the CCD illustrated in FIG. 4 separately in the frame rate time of the through image data, thereby generating a piece of still picture data. This makes it possible for the CPU 21 to display the through image of the object on the display unit 20 even if the still picture shooting process is in progress.

Because the CCD 9 is under the exposure control suitable for the still picture shooting, and the CCD 10 is under the exposure control suitable for the through image display, the CCD 9 and the CCD 10 have different exposure times.

C. Operation of the Digital Camera 1

The operation of the digital camera 1 according to the first embodiment will be explained with reference to the flowchart in FIG. 5.

As a still picture shooting mode is set by the user's manipulation of the mode changing key of the key input unit 23, the CPU 21 controls the vertical driver 11 through the TG 12, and starts a process of alternately driving the CCD 9 and the CCD 10 under the control suitable for the through image display (step S1). At this time, the exposure periods and transfer periods of the CCD 9 and the CCD 10 are shifted at half periods. The CCD 9 and the CCD 10 are operated by the foregoing two pixel addition driving.

Next, the CPU 21 displays image data transferred alternately from the CCD 9 and the CCD 10 on the display unit 20 (step S2).

Specifically, as illustrated in FIG. 2, image data transferred alternately from the CCD 9 and the CCD 10 is sequentially input to the image generator 15. The image generator 15 performs the image process for a through image on the input image data, and generates through image data. The CPU 21 sequentially displays the generated through image data on the display unit 20. Accordingly, it is possible to perform through image display of the object at a frame rate twice as much as the frame rate of the image data output from the CCDs 9, 10.

Next, the CPU 21 determines whether the user presses the shutter button halfway or not (step S3). The CPU 21 performs determination based on whether or not a control signal corresponding to halfway press of the shutter button is sent from the key input section 23.

When it is determined in the step S3 that the shutter button is not pressed halfway (step S3: NO), the process returns to the step S2. When it is determined that the shutter button is pressed halfway (step S3: YES), the CPU 21 sends a control signal to the TG 12, and switches over the driving of either one of the CCDs under the control suitable for the through image display to the driving under the control suitable for the AF process, and starts execution of the AF process by the contrast detection scheme with the changed CCD (step S4). The CPU 21 uses the CCD driven by the changed driving suitable for the AF process, detects the AF evaluation values of the individual lens positions within all search range, moves the focus lens to a lens position where the AF evaluation value reaches a peak, thereby executing the AF process.

At the time of detecting the peak value in the AF evaluation values, the CPU 21 may terminate searching of the AF evaluation values, move the focus lens to a lens position where the AF evaluation value reaches a peak, and complete the AF process.

In the AF process by the contrast detection scheme at this time, the CPU 21 speeds up the moving speed of the focus lens in accordance with the frame rate (transfer period) of the CCD driven under the control suitable for the AF process. For example, if the CCD driven under the control suitable for the AF process is subjected to the high speed driving, and the frame rate of the CCD becomes four times higher, the AF process by the contrast detection scheme is executed with the moving speed of the focus lens set to a speed four times faster than the original speed.

In a case where the driving suitable for the AF process is under only the exposure process suitable for the AF process, since the frame rate is not raised, the moving speed of the focus lens is not speeded up.

Figure 5:
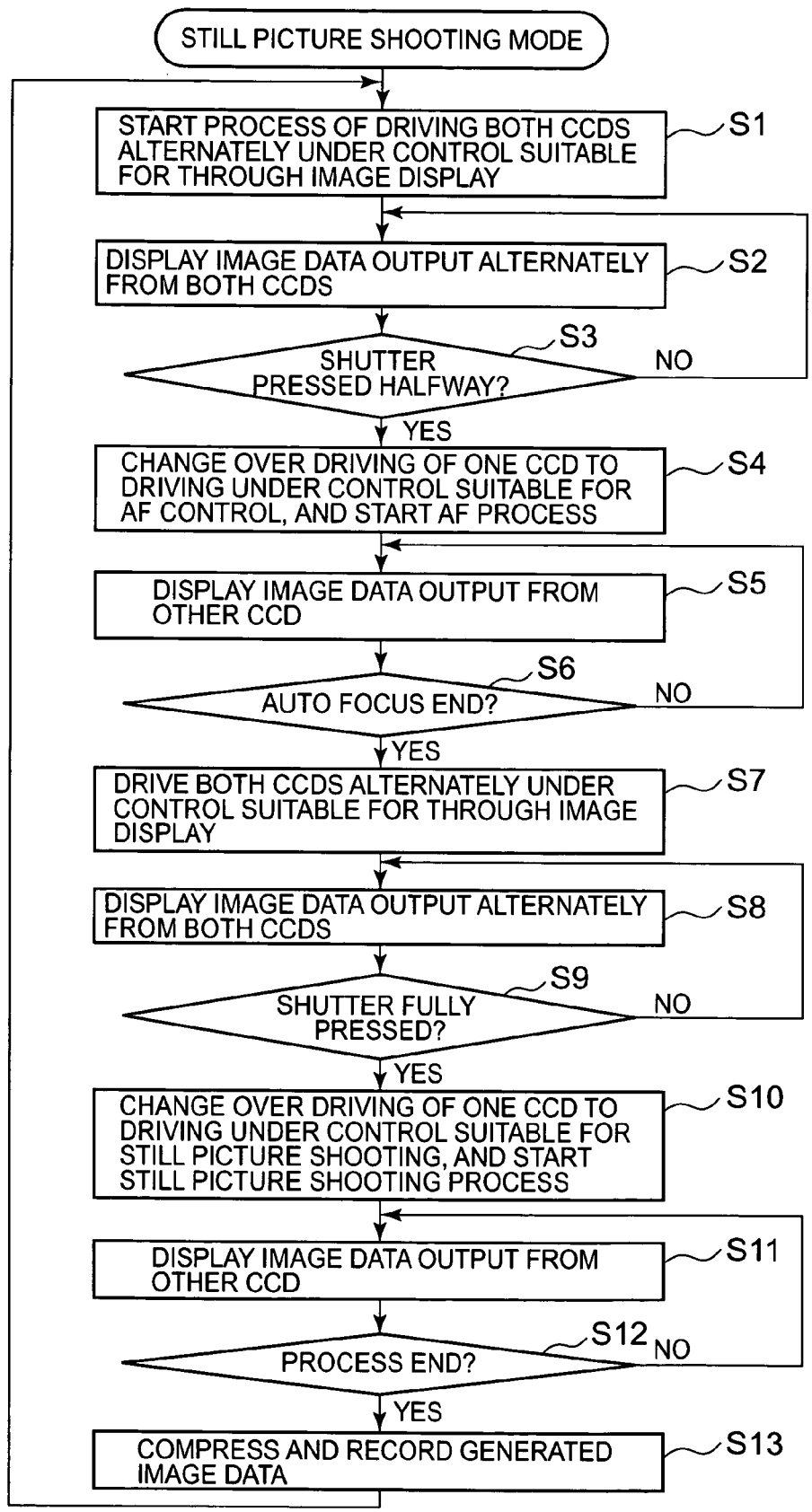
FIG. 5 is a flowchart illustrating the operation of the digital camera of the first embodiment.

Return to the flowchart in FIG. 5, as the AF process starts at the step S4, the CPU 21 displays image data, which is output from the other CCD and is undergone the image process for the through image display by the image generator 15, as a through image on the display unit 20 (step S5). At this time, as the image data output from the one CCD is displayed on the display unit 20, the frame rate of displayed through image data becomes half of the frame rate of the through image data displayed at the step S2, but the through image of the object can be displayed even if the AF process is in progress.

Next, the CPU 21 determines whether the AF process is completed or not (step S6). When it is determined that the AF process is not completed (step S6: NO), the process returns to the step S5.

As illustrated in FIG. 3, in the AF mode, the CPU 21 drives the CCD 9 by the four pixel addition driving, the partial read-out driving (read-out driving of the half lines of all lines), and the driving under the exposure control suitable for the AF process, drives the CCD 9 under the control suitable for the AF process, and drives the CCD 10 under the control suitable for the through image display. Therefore, the frame rate of the image data output from the CCD 9 is four times as much as the frame rate of the image data output from the CCD 10. That is, the AF process time can be shortened as one-fourth of that of the normal AF process by the contrast detection scheme. The image generator 15 performs the image process for the through image display only on the image data output from the CCD 10. The image data undergone the image process for the through image display is to be displayed on the display unit 20.

In the step S6, when it is determined that the AF process is completed (step S6: YES), the CPU 21 controls the vertical driver 11 through the TG 21, changes over the driving of the CCD (CCD 9 in this case) driven under the control suitable for the AF process to the driving under the control suitable for the through image display, and drives the CCDs 9, 10 with the driving of the CCD 9 and the driving of the CCD 10 shifted at a half period (step S7).

The CPU 21 displays image data transferred alternately from the CCD 9 and the CCD 10 on the display unit 20 (step S8). The operation at this time is the same as that of the step S2. That is, the image data transferred alternately from the CCD 9 and the CCD 10 is sequentially input to the image generator 15. The image generator 15 performs the image process for the through image display in the input order of the image data, and generates through image data. The CPU 21 displays the generated image data on the display unit 20 in sequence.

Next, the CPU 21 determines whether or not the shutter button is fully pressed (step S9). The CPU 21 performs determination based on whether or not a manipulation signal corresponding to full press of the shutter button is sent from the key input unit 23.

When it is determined that the shutter button is not fully pressed (step S9: NO), the process returns to the step S8. When it is determined that the shutter button is fully pressed (step S9: YES), the CPU 21 sends a control signal to the TG 12, changes over the driving of either one of the CCD under the control suitable for the through image display to the driving under the control suitable for the still picture shooting process, and starts the still picture shooting process (step S10).

That is, the CPU 21 performs the exposure control suitable for the still picture shooting, reads out electrical charges charged in all pixels of the CCD one line by one line, reads out electrical charges (image data) charged in all pixels, and generates still picture data from the read out image data.

As the still picture shooting process is started, the CPU 21 displays image data, which is output from the other CCD, and is undergone the image process for a through image by the image generator 15, as a through image on the display unit 20 (step S11). At this time, because the image data output from the one CCD is displayed on the display unit 20, the frame rate of the displayed through image data becomes the half of the frame rate of the through image data displayed at the steps S2, S8, but it is possible to display the through image of the object even if the still picture shooting process is in progress.

Next, the CPU 21 determines whether or not the still picture shooting process is completed, i.e., whether or not the image generator 15 completes generation of the still picture data (step S12). When it is determined that the still picture shooting process is not completed (step S12: NO), the process returns to the step S11.

As illustrated in FIG. 4, in the still picture shooting process, the image generator 15 generates through image data from the image data sequentially sent at the transfer period of the CCD 10. The image generator 15 generates still picture data corresponding to the image data transferred from the CCD 9 separately in multiple times during generation of the through image data from the image data transferred from the CCD 10.

That is, the image generator 15 generates the still picture data from the image data transferred from the CCD 9 separately in the frame rate times of the through image data, thereby generating a piece of still picture data.

When it is determined in the step S12 that the still picture shooting process is completed (step S12: YES), i.e., when it is determined that the still picture data is generated, the CPU 21 causes the compression circuit 24 to compress a piece of the generated still picture data, causes the flash memory 25 to store the compressed still picture data (step S13), and returns the process to the step S1.

D. As explained above, in the first embodiment, in the through image display mode, the CPU 21 shifts the driving periods of the CCD 9 and the CCD 10 by a half period, and image data imaged by the CCD 9 and the CCD 10 is undergone the through image display, it is possible to raise the frame rate of the through image without increasing the driving frequencies of the CCD 9 and the CCD 10.

In the AF mode, because the CPU 21 drives the one CCD under the control suitable for the AF process, and drives the other CCD under the control suitable for the through image display, it is possible to perform the through image display of the object even if the AF process is in progress. As the one CCD is driven under the exposure process suitable for the AF process, it is possible to enhance the accuracy of the AF process.

In the still picture shooting process, as the one CCD is driven under the control suitable for the still picture shooting, and the other CCD is driven under the control suitable for the through image display, it is possible to display the through image of the object even if the still picture shooting process is in progress. As the image generator 15 generates the still picture data during the generation of the through image, the CPU 21 can display the through image of the object on the display unit 20 even if the still picture shooting is in progress.

In the first embodiment, the through image data is displayed on the display unit 20, but may be displayed on the display unit 20 and stored in the flash memory 25.

Instead of performing the image process for the through image, the image generator may generate motion picture data by performing an image process for motion picture shooting, and the CPU 21 may store the generated motion picture data in the flash memory 25, and display the through image of the object on the display unit 20. At this time, the CCD may be driven under control suitable for the motion picture shooting, instead of the driving under the control suitable for the through image display. Specifically, in the through image display at the steps S2 and S8, the CPU 21 displays the image data transferred alternately from the CCD 9 and the CCD 10 on the display unit 20, and stores the image data in the flash memory 25. In the through image display at the steps S5 and S11, the CPU 21 displays image data output only from the other CCD on the display unit 20, and stores the image data in the flash memory 25.

Second Embodiment

Next, the second embodiment will be explained.

In the first embodiment, as the shutter button is fully pressed, the one CCD executes the still picture shooting process, and the image data imaged by the other CCD is displayed as a through image. A difference from the first embodiment is that both of the CCDs perform still picture shooting of the object as the shutter button is fully pressed in the second embodiment.

A. Operation of the Digital Camera 1

The second embodiment uses the digital camera 1 having the same structure as one illustrated in FIG. 1.

The operation of the digital camera 1 in the second embodiment will be explained with reference to the flowchart of FIG. 6. Since the operations from the step S1 to the step S9 in FIG. 5 are the same as those of the first embodiment, the explanation thereof will be omitted.

When it is determined in the step S9 in FIG. 5 that the shutter button is fully pressed (step S9: YES), the process progresses to step S51 in FIG. 6. That is, the CPU 21 drives the CCD 9 and the CCD 10 in such a way that exposure start timings thereof differ from each other. In more detail, the CPU 21 causes the CCDs 9, 10 to perform exposure on the lights of the object, reads out electrical charges charged in all pixels of the CCDs one line by one line, and reads out the electrical charges (image data) charged in all of the pixels. The CPU 21 acquires image data obtained from the CCDs 9, 10 (step S51).

Figure 7:
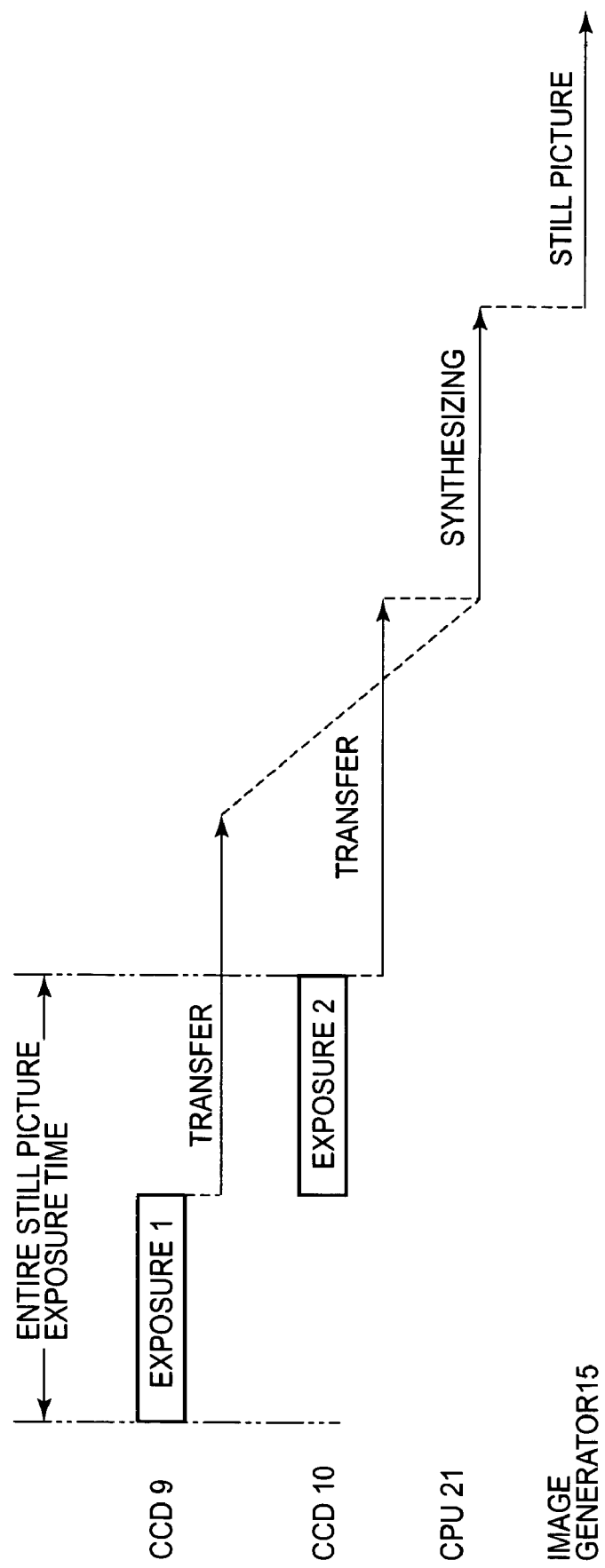
FIG. 7 is a time chart illustrating operations of the CCD 9, the CCD 10, a CPU 21, and the image generator 15 according to the second embodiment.

FIG. 7 is a time chart illustrating the operations of the CCD 9, the CCD 10, the CPU 21, and the image generator 15.

As illustrated in the figure, the CPU 21 causes the CCD 9 and the CCD 10 to bear the entire still picture exposure time. That is, the CPU 21 performs exposure (in the figure, "exposure 1") with the CCD 9. As the exposure of the CCD 9 ends, the CPU 21 performs exposure (in the figure, "exposure 2") with the CCD 10. The CPU 21 transfers image data of the CCD 9, and transfers image data of the CCD 10 as the exposure of the CCD 10 ends.

In general, when CCDs perform exposure of an object, a noise called dark current is generated. The dark current noise has a characteristic such that it rapidly increases as an exposure time becomes longer. Accordingly, like this embodiment, as the two CCDs bear the exposure time, the exposure time of each CCD is shortened, and this makes it possible to suppress increment of the dark current noise.

Note that the exposure times of the exposure 1 and the exposure 2 may be the same, or different from each other.

The exposure 2 may start simultaneously with ending of the exposure 1, or before the exposure 1 ends. That is, the exposure of the CCD 9 may overlap the exposure of the CCD 10.

The entire exposure time may be further divided minutely, and the CCDs 9, 10 may perform exposure. For example, in a case where the entire exposure time is divided into four, either one of the CCDs performs exposure at the first time, and the other CCD performs exposure at the second time. The one CCD performs exposure at the third time, and the other CCD performs exposure at the fourth time. Accordingly, an exposure time is further shortened, and it is possible to further suppress generation of the dark current noise. In this case, four pieces of image data are obtained.

According to the present embodiment, the total of the exposure times allocated to the respective CCDs is equal to the exposure time required for only one CCD to perform still picture shooting. However, the total of the exposure times may be made different from the exposure time required for only one CCD to perform still picture shooting, by increasing or decreasing the exposure times of the respective CCDs. The CPU 21 can calculate the exposure times of the respective CCDs based on the exposure times obtained by dividing the exposure time required for only one CCD to perform still picture shooting by the number of CCDs. For example, the total of the exposure times may be varied by increasing or decreasing the exposure times in accordance with the dark current noise characteristics of the respective CCDs.

Next, the CPU 21 synthesizes two pieces of acquired image data, and generates synthesized image data (step S52).

At this time, if image data generated by merely adding two pieces of image data is taken as the synthesized image data, image data undergone synthesizing may include a saturated part (whitened part). Therefore, in the step S52, the CPU 21 adds two pieces of image data, and converts the added image data in such a way that there is no saturated part, thereby generating a piece of synthesized image data without a saturated part. For example, if the value of each pixel data obtained by one exposure is 12 bit (0 to 4095), the value of each added pixel data becomes 13 bit (0 to 8191).

An example of a synthesized image data generation process in the step S52 will be simply explained.

Figure 8:
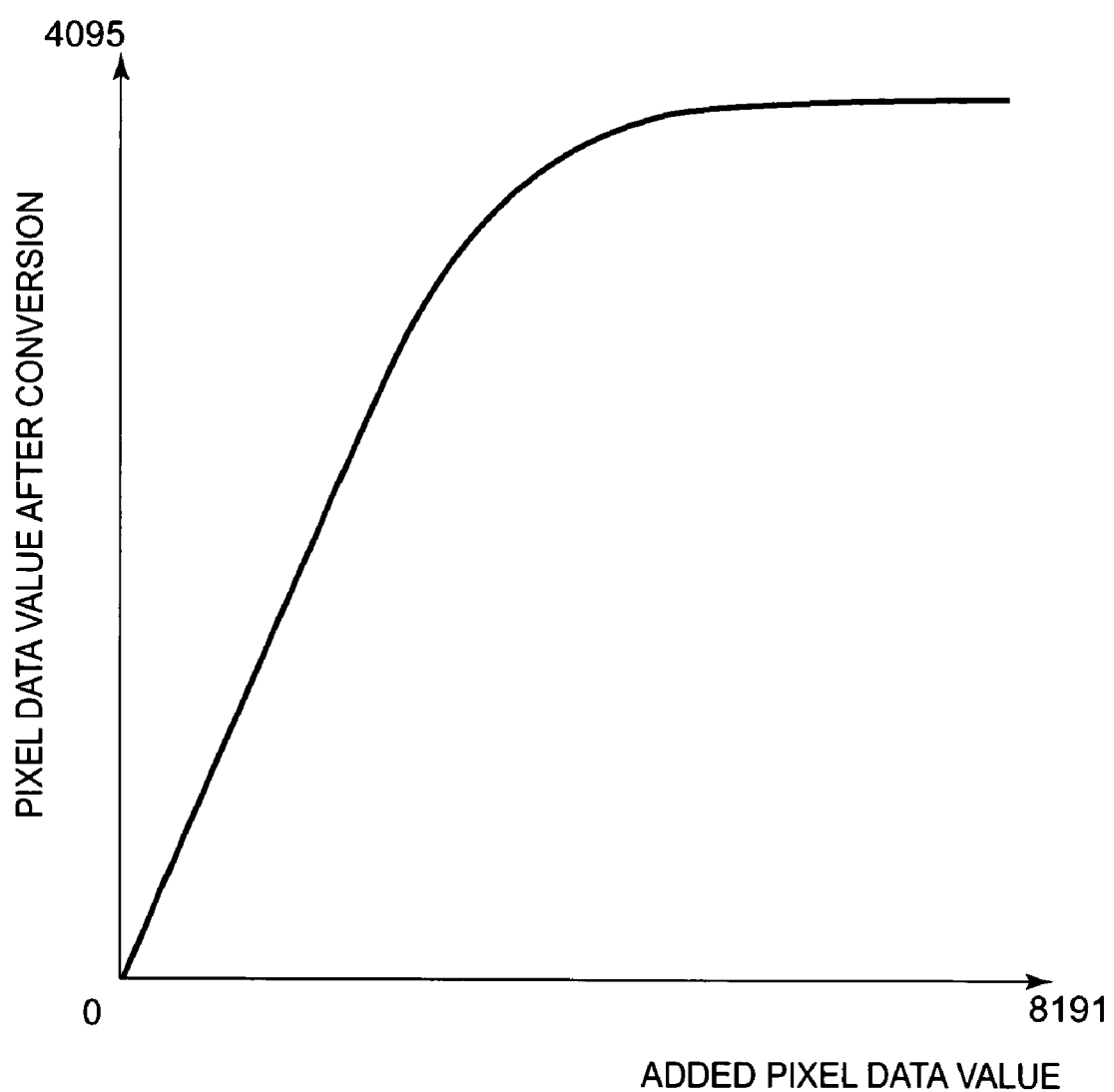
FIG. 8 is a diagram illustrating a conversion characteristic.

FIG. 8 is a diagram illustrating a conversion characteristic. Each added pixel data (13 bit) is converted into non-saturated pixel data (12 bit) in accordance with the conversion characteristic illustrated in this figure.

As illustrated in the figure, an approximately linear characteristic is held within a range where the value of pixel data is small, and a gradation change is held within a range where the pixel data is large, i.e., where the value is close to saturation.

In a case where the number of exposures is greater than or equal to three, the position of the flexion point of the conversion characteristic may be adjusted in accordance with the range of possible values of the added pixel data. The histogram of the added pixel data may be statistically analyzed, and the conversion characteristic may be determined based on an analysis result.

As mentioned, when one CCD performs exposure for a long time, saturated pixels are generated, but if the CCD 9 and the CCD 10 bear the exposure for a still picture exposure time, the exposure time is shortened, and non-saturated image data can be obtained from the CCD 9 and the CCD 10. The image generator 15 can generate a piece of synthesized image data in such a way that a pixel value is not to be saturated.

Figure 6:
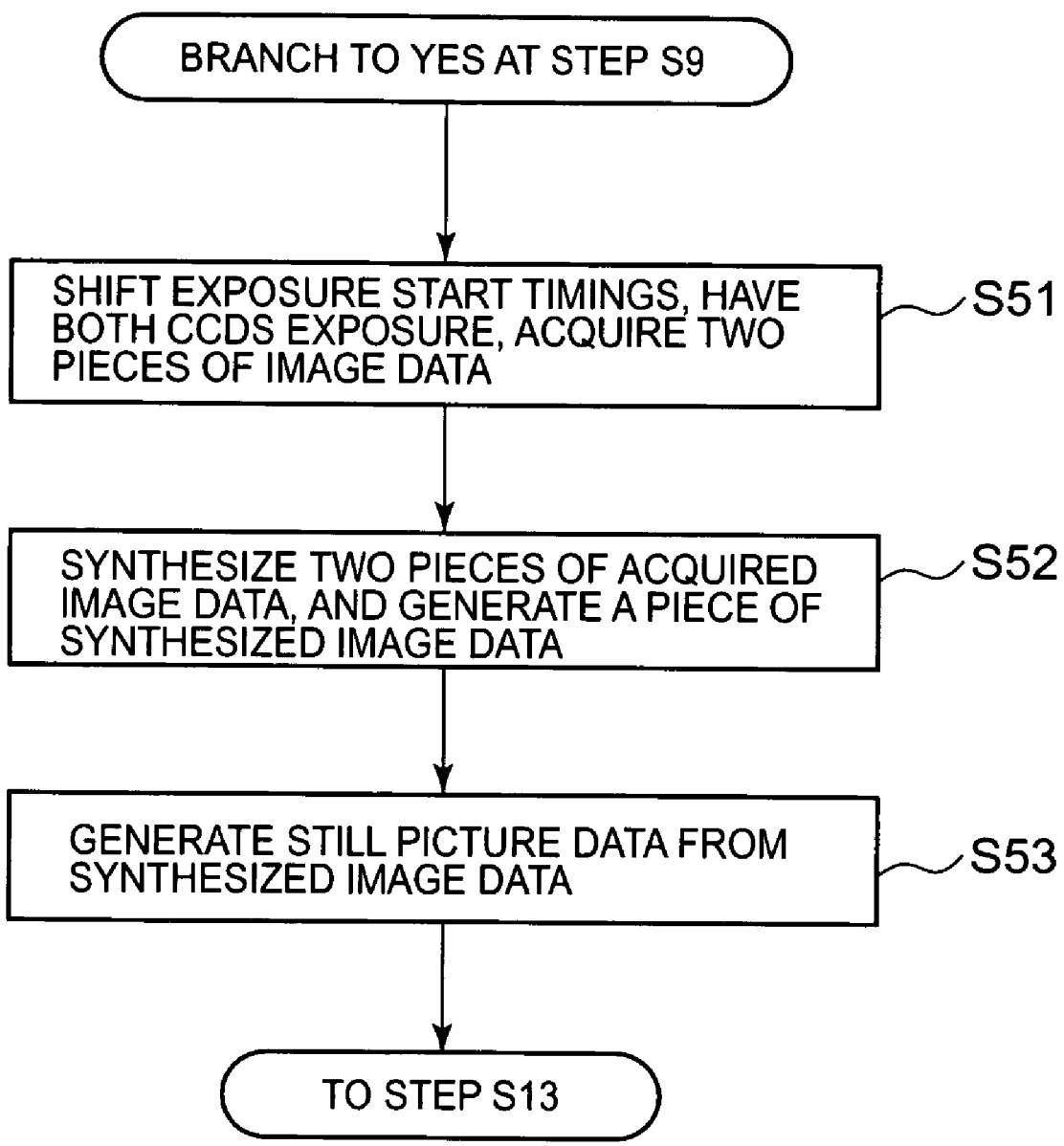
FIG. 6 is a flowchart illustrating the operation of the digital camera according to a second embodiment.

Return to the flowchart in FIG. 6, after a piece of image data is generated, the CPU 21 controls the image generator 15 to perform the image process for a still picture on the piece of generated synthesized image data, and generates still picture data (step S53). The process progresses to the step S13 in FIG. 2.

B. As explained above, in the second embodiment, in the still picture shooting mode, the CPU 21 causes the CCD 9 and the CCD 10 to bear the entire still picture exposure time and perform exposure, the exposure time of each CCD becomes shorter than the still picture exposure time, and it is possible to suppress generation of the dark current noise.

Because the CPU 21 performs still picture exposure separately in multiple times, and the image generator 15 synthesizes image data obtained by the respective exposures, the image generator 15 can synthesize image data in such a way that pixel values after synthesizing are not saturated.

MODIFIED EXAMPLES

The modified examples which are explained below and modify each of the foregoing embodiments in many ways can be employed.

Figure 9:
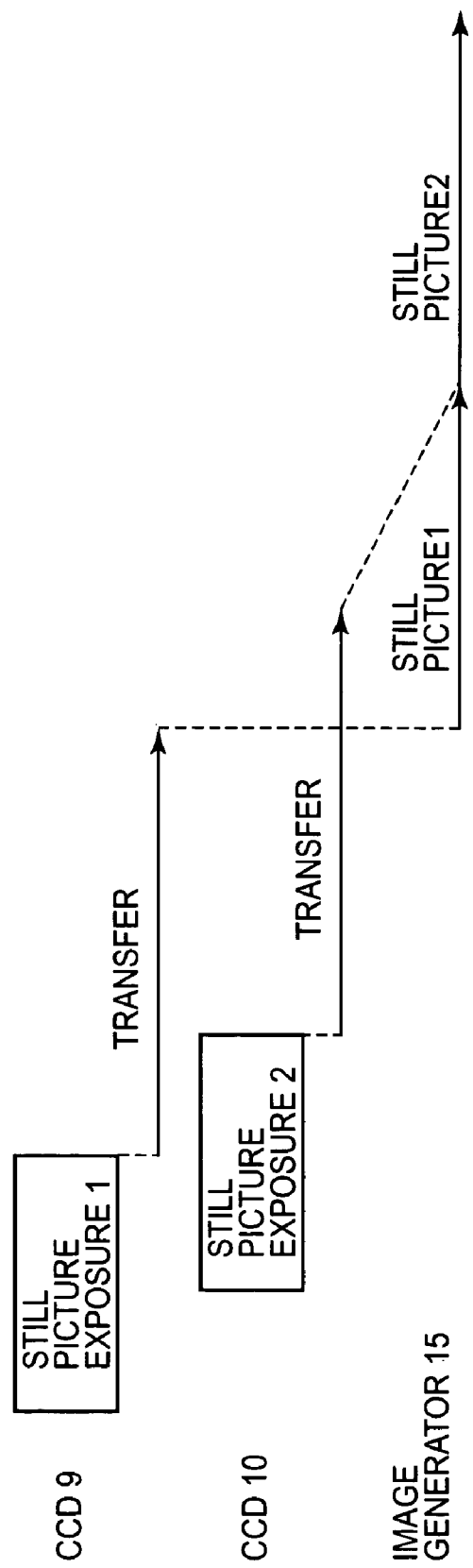
FIG. 9 is a time chart illustrating operations of the CCD 9, the CCD 10, and the image generator 15 according to a modification.

(1) In the second embodiment, the CPU 21 causes the CCDs 9, 10 to perform exposure with the exposure start timings of the CCD 9 and the CCD 10 shifted, and the image generator 15 synthesizes plural pieces of image data obtained by the exposure, and generates still picture data. However, as illustrated in FIG. 9, the CPU 21 may cause the CCD 9 and the CCD 10 to perform exposure with the exposure start timings of the CCDs 9, 10 shifted, and the image generator 15 may generate still picture data by other schemes, without synthesizing image data transferred from the CCD 9 and image data transferred from the CCD 10. That is, the CPU 21 performs an image process for a still picture on both of the image data transferred from the CCD 9 and the image data transferred from the CCD 10, and controls the image generator 15 in such a manner as to generate two pieces of still picture data. This enables fast continuous shooting of the object. The two pieces of generated still picture data are both compressed and stored in the flash memory 25.

Figure 10:
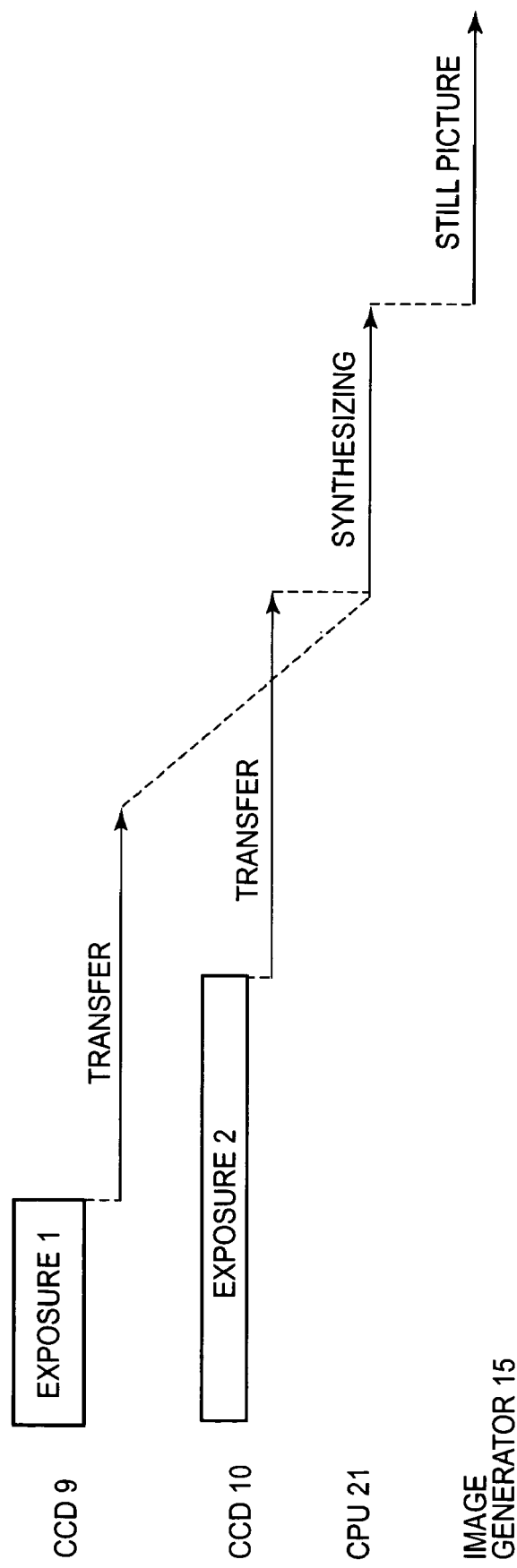
FIG. 10 is a time chart illustrating operations of the CCD 9, the CCD 10, the CPU 21, and the image generator 15 according to another modification.

As illustrated in FIG. 10, the CPU 21 may cause the CCD 9 and the CCD 10 to perform exposure at the same exposure start timing, and set the exposure time of the CCD 9 and that of the CCD 10 different from each other. In the case of this figure, the exposure time of the CCD 9 is short, and the exposure time of the CCD 10 is long. The CPU 21 synthesizes image data transferred from the CCD 9 and image data transferred from the CCD 10, causes the image generator 15 to perform the image process for a still picture on a piece of synthesized image data, and generate a piece of still picture data. This makes it possible to generate still picture data with a wide dynamic range. The generated still picture data is compressed and stored in the flash memory 25.

As illustrated in FIG. 11, the CPU 21 may have the CCD 9 and the CCD 10 perform exposure at the same exposure start timing and the same exposure end timing. For example, either one of the ND filer 5 and the ND filter 6 is set in such a manner as to pass most of an entering light amount, and the other ND filter is set in such a manner as to pass the half of an entering light amount. The CPU 21 synthesizes image data transferred from the CCD 9 and image data transferred from the CCD 10, causes the image generator 15 to perform the image process for a still picture on a piece of synthesized image data, and generates a piece of still picture data. This makes it possible to generate still picture data with a wide dynamic range. The generated still picture data is compressed, and stored in the flash memory 25.

(2) In each of the foregoing embodiments, the optical path length of a light entering into the CCD 9 are changed together with the optical path length of a light entering into the CCD 10 by moving the focus lens of the shooting lens 2. However, a focus lens which changes the optical path length of the light entering into the CCD 9 and a focus lens which changes the optical path length of the light entering into the CCD 10 may be separately provided.

Without providing a focus lens, the optical path length of the light entering into the CCD 9 and the optical path length entering into the CCD 10 may be individually changed by separately moving the CCD 9 and the CCD 10 in optical axis directions.

(3) In each of the foregoing embodiments, the digital camera 1 has the two CCDs, but may have greater than or equal to three CCDs. Accordingly, it is possible to raise the frame rate of through image data in the through image display mode, and the frame rate in the AF mode.

The imaging device is not limited to the digital camera 1 in the foregoing embodiments, and may be a camera-mounted cellular phone, a camera-mounted PDA, a camera-mounted personal computer, a camera-mounted IC recorder, or a digital video camera. The imaging device may be any device which can shoot an object.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-286232 filed on Sep. 30, 2005, and including specification, claims, drawings and summary. The disclosure of the above Japanese Patent Application is incorporated herein by reference in its entirety.

What is claimed is:

1. An imaging device comprising:
   first and second imaging elements each of which converts a light of an object into image data;
   a motion picture imaging controller which, when an auto focus process is not performed, controls imaging of a motion picture of the object in such a way that first image data converted by the first imaging element and second image data converted by the second imaging element and having a same angle as the first image data are alternately output by driving the first and second imaging elements, so that one motion picture is created; and
   a focus controller which, when an auto focus process is performed, controls one of the first and second imaging elements to image the motion picture of the object, and which concurrently controls the other one of the first and second imaging elements to perform auto focusing on the object.

2. The imaging device according to claim 1, wherein the focus controller drives the other one of the first and second imaging elements for auto focusing under control which is suitable for an auto focus process.

3. The imaging device according to claim 2, wherein driving under the control suitable for the auto focus process includes at least one of driving by exposure control suitable for detection of an auto focus evaluation value, and high speed driving.

4. The imaging device according to claim 2,
   wherein the control suitable for the auto focus process comprises high speed driving, and
   wherein the high speed driving includes at least one of pixel addition driving and partial read-out driving.

5. The imaging device according to claim 2,
   wherein the control suitable for the auto focus process comprises high speed driving, and
   wherein a frame rate of image data output from the other one of the first and second imaging elements controlled by the high speed driving is greater than or equal to a frame rate of image data obtained by the motion picture imaging controller, or greater than or equal to a frame rate of image data output from the one of the first and second imaging elements controlled to image the motion picture under the control of the focus controller.

6. The imaging device according to claim 2, further comprising a contrast auto focusing unit which detects an auto focus evaluation value based on image data output from the other one of the first and second imaging elements in each optical path length by changing optical path lengths of lights of the object entering the other one of the first and second imaging elements used by the focus controller for auto focusing, controls an optical path length of a light entering into the first and/or second imaging element in such a way that an auto focus evaluation value in detected auto focus evaluation values becomes a peak, and performs auto focusing on the object, and
   wherein the focus controller controls imaging of the motion picture of the object with the one of the first and second imaging elements, and causes the contrast auto focusing unit to perform an auto focus operation with the other of the first and second imaging elements driven under the control suitable for the auto focus process.

7. The imaging device according to claim 1, further comprising:
a still picture shooting controller which controls imaging of the motion picture of the object with one of the first imaging element and the second imaging element, and controls imaging of a still picture of the object with the other one of the first and second imaging elements; and
a first recording controller which records image data output from the other one of the first and second imaging elements by the still picture shooting controller into a recording unit.

8. The imaging device according to claim 7, further comprising an image generator which sequentially generates through image data or motion picture data from image data output from the one of the first and second imaging elements used for imaging of the motion picture under control of the still picture shooting controller, and generates still picture data between a creation of the through image data or motion picture data separately based on the image data output from the other one of the first and second imaging elements used for still picture shooting, and
wherein the first recording controller records the still picture data generated by the image generator in the recording unit.

9. The imaging device according to claim 1, wherein the motion picture imaging controller drives the first imaging element and the second imaging element used for imaging the motion picture of the object under control suitable for through image display.

10. The imaging device according to claim 1, wherein the focus controller drives the one of the first and second imaging elements used for imaging of the motion picture under control suitable for through image display.

11. The imaging device according to claim 7, wherein the still picture shooting controller drives the one of the first and second imaging elements used for imaging the motion picture under control suitable for through image display.

12. The imaging device according to claim 1, further comprising a display controller which displays image data obtained by imaging the motion picture by the motion picture imaging controller on a display unit.

13. The imaging device according to claim 1, further comprising a display controller which displays image data output from the one of the first and second imaging elements used for imaging the motion picture by the focus controller on a display unit.

14. The imaging device according to claim 7, further comprising a display controller which displays image data output from the one of the first and second imaging elements used for imaging the motion picture by the still picture imaging controller on a display unit.

15. The imaging device according to claim 1, further comprising a recording controller which records image data obtained by imaging the motion picture by the motion picture shooting controller in a recording unit.

16. The imaging device according to claim 1, further comprising a recording controller which records image data output from the one imaging element used for imaging the motion picture by the focus controller in a recording unit.

17. The imaging device according to claim 7, further comprising a second recording controller which records image data output from the one of the first and second imaging elements used for imaging the motion picture by the still picture shooting controller in the recording unit.

18. The imaging device according to claim 1, further comprising:
a shutter button which is pressable halfway and fully; and
a controller which: (i) causes the motion picture imaging controller to drive the first imaging element and the second imaging element to image the motion picture of the object until the shutter button is pressed halfway, (ii) causes the focus controller to control imaging of the motion picture of the object with the one of the first and second imaging elements, and perform auto focusing on the object with the other of the first and second imaging elements when the shutter button is pressed halfway, and (iii) causes the motion picture imaging controller to control the imaging of the motion picture of the object with the one of the first and second imaging elements and to control still picture imaging of the object with the other of the first and second imaging elements when the shutter button is fully pressed.

19. An imaging device comprising:
first and second imaging elements each of which converts a light of an object into image data;
a still picture shooting controller which controls the first imaging element to image a motion picture of the object, and which concurrently controls the second imaging element to shoot a still picture of the object; and
an image generator which sequentially generates through data or motion picture data from image data output from the first imaging element by the still picture shooting controller, and which generates still picture data between generation of the through data or motion picture data separately based on image data output from the second imaging element.

20. An imaging method for an imaging device having first and second imaging elements each of which converts a light of an object into image data, said imaging method comprising:
when an auto focus process is not performed, imaging a motion picture of the object in such a way that first image data converted by the first imaging element and second image data converted by the second imaging element and having a same angle as the first image data are alternately output by driving the first and second imaging elements, so that one motion picture is created; and
when an auto focus process is performed, controlling one of the first and second imaging elements to image the motion picture of the object, and concurrently controlling the other of the first and second imaging elements to perform auto focusing on the object.

21. A non-transient computer-readable medium having stored thereon a program for controlling an imaging device having first and second imaging elements each of which converts a light of an object into image data to perform functions comprising:
when an auto focus process is not performed, imaging a motion picture of the object in such a way that first image data converted by the first imaging element and second image data converted by the second imaging element and having a same angle as the first image data are alternately output by driving the first and second imaging elements, so that one motion picture is created; and
when an auto focus process is performed, controlling one of the first and second imaging elements to image the motion picture of the object, and concurrently controlling the other of the first and second imaging elements to perform auto focusing on the object.

* * * * *